Sept. 16, 1958 M. E. MORROW ET AL 2,852,744
GALVANOMETER ASSEMBLY
Filed Jan. 12, 1953

INVENTORS,
Marvin E. Morrow,
GEORGE ROBERT MORROW
BY
ATTORNEY.

United States Patent Office 2,852,744
Patented Sept. 16, 1958

2,852,744

GALVANOMETER ASSEMBLY

Marvin E. Morrow and George Robert Morrow, Tulsa, Okla., assignors to Midwestern Instruments, Inc., a corporation of Delaware Application January 12, 1953, Serial No. 330,864

5 Claims. (Cl. 324—156)

This invention relates to recording galvanometers of the D'Arsonval or moving coil, totally-enclosed barrel type wherein the coil which carries current to be recorded is suspended between the poles of a magnet, and wherein the moment of inertia of the coil or loop with its attached mirror, as well as the torsional stiffness of the structure utilized to suspend the same, are primary factors in determination of the galvanometer's undamped natural frequency.

Light is reflected from the mirror to photographic recording paper, and since each trace requires a separate element, a bank of galvanometer elements are usually assembled together as a unit to produce a single record for visual analysis.

A beam of light within the recording camera is caused to impinge upon the mirrors of the multiple galvanometer bank, which light is reflected on the recording film. The multiple galvanometer assembly must be shock-proof and be mounted so as to be free from vibrations and other disturbances transmitted through the oscillograph case.

Whether the instrument is employed in the field of geophysics, for electrical or seismic surveys, well logging, or for any other purpose to record alternating voltage oscillations, sensitivity requirements make it imperative that the suspended coil assembly be free of all factors tending to have deleterious effects thereon.

The relatively small dimensions of the structural parts to permit multiple mounting in a small, compact magnetic block, the problems of assembling and adjusting such delicate parts, coupled with the fact that the recorder is subjected to abuse in the field under all types of environmental conditions, particularly temperature fluctuations, present problems which many have sought to overcome by various designs.

It is the most important object of this invention therefore, to provide a coil suspension that may be adjusted within minute tolerances without fear of ultimate failure or change when placed in use and subjected to the adverse conditions above mentioned.

It is an object hereof to provide an assembly which may be initially assembled, adjusted and tested in a manner to avoid subsequent difficulty resulting from the manner of adjustment itself. In this respect, conventional constructions require frequent adjustments because of the fact that in the process of manufacture, the coil suspension is so affected as to become out of adjustment because of such effects thereon when subjected to abuse and temperature changes.

It is an object of this invention to provide a galvanometer assembly wherein the mirror suspended within the barrel with the coil may be adjusted, not only initially with respect to a clearance port in the barrel, but subsequently with respect to a clearance opening within an outermost case for the galvanometer and therefore, with respect to the photographic recording medium without the necessity of turning or twisting the mirror or coil within the barrel or tube and with respect to the mounting means therein for holding the coil in suspension.

A further object hereof is to provide a galvanometer assembly made as above set forth so as to avoid all residual torsion on the suspension ribbon, whereby to obviate drift due to acceleration and temperature changes.

A further object hereof is to provide an assembly wherein it is possible to provide a completely closed and sealed galvanometer tube to permit a leak-proof construction adapted to receive a fluid filling for viscous damping of the suspension assembly, which fluid-tight seal need not be interrupted in order to make rotational adjustments of the barrel within the case and thereby properly position the reflected image from the mirror on the recording paper or film.

A still further object hereof is to provide a case for the aforementioned purposes which may be mounted in a magnetic block for angular adjustment therein by employment of any suitable adjustable mounting that may be desired.

Other objects relate to important details of construction, all of which will be made clear as the following specification progresses, and in the drawing.

Figure 1:
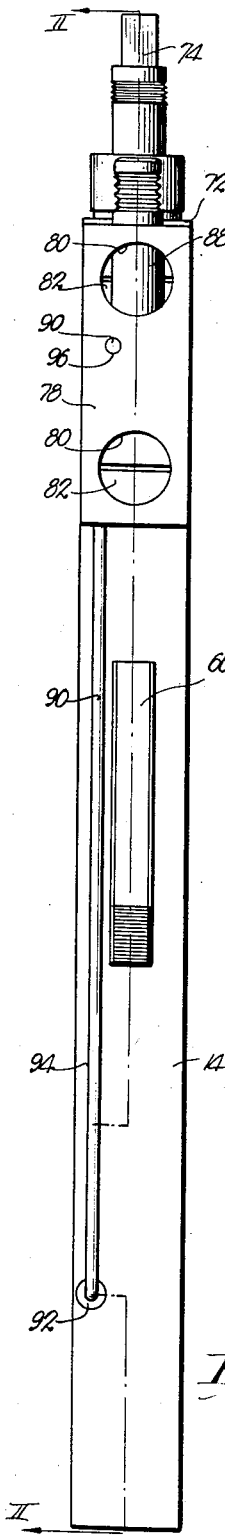
Figure 1 is an elevational view of a galvanometer assembly made pursuant to my present invention.
Figure 2:
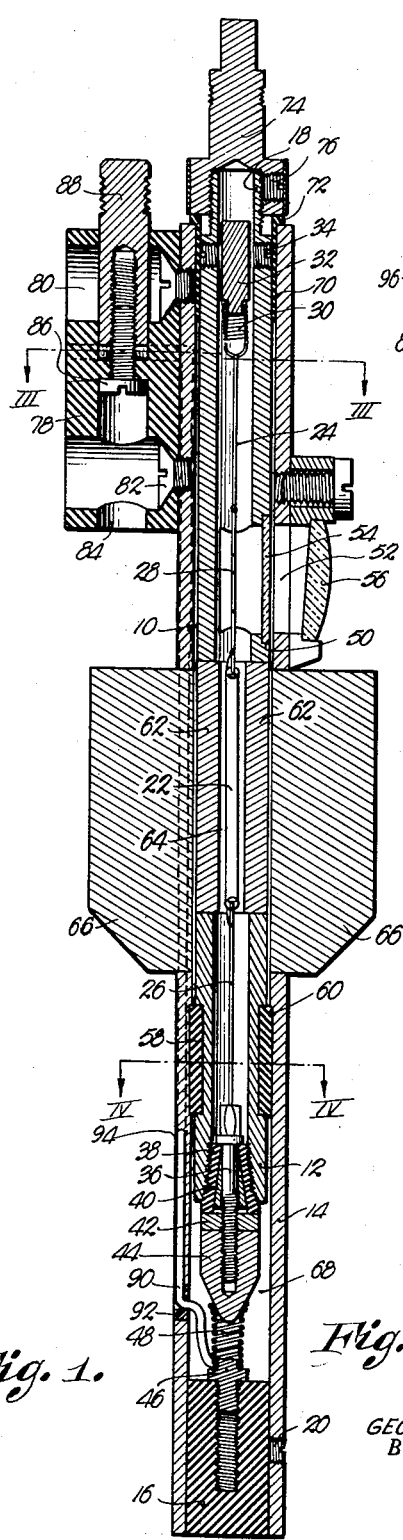
Fig. 2 is a substantially central, longitudinal, cross-sectional view through the assembly.
Figure 3:
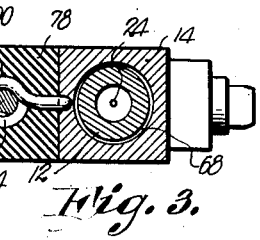
Fig. 3 is a detailed, cross-sectional view taken on line III—III of Fig. 2.
Figure 4:
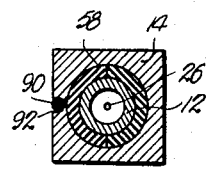
Fig. 4 is a transverse, cross-sectional view taken on line IV—IV of Fig. 2.

The galvanometer per se forming the subject matter hereof is broadly designated by the numeral 10, and is of the barrel type such as disclosed in my U. S. Letters Patent No. 2,439,576, dated April 13, 1948, and is substantially identical with the galvanometer forming the subject matter of my co-pending application, Serial No. 184,156, now Patent No. 2,651,756, filed September 11, 1950, this being a continuation-in-part thereof.

The galvanometer includes an elongated tube 12 that is appreciably shorter than an elongated case 14 within which it is mounted, the lowermost end of tube 12 being spaced above a plug 16 closing the lowermost end of the tubular case 14, and the uppermost end of the tube 12 extending above the normally uppermost end of case 14, terminating in an externally threaded portion 18.

The tube 12 and the case 14 are both preferably made from a metallic material, and therefore, the plug constitutes an electrical insulator removably held in place by a setscrew or other fastening means 20. An electric coil or loop 22 is held suspended within the tube 12 by a pair of opposed ribbons 24 and 26, the former mounting a small mirror 28 in the usual manner. A spring 30 connects the ribbon 24 with a conductor pin 32 that is in turn held in place within the tube 12 adjacent the uppermost end thereof by a pair of opposed setscrews 34. The ribbon 26 is secured to a conducting pin 36 resting upon the uppermost end of a bushing 38 extending into the tube 12 at the lowermost end thereof and preferably made from ivory or other suitable material. Pin 36 is centered on the longitudinal axis of the tube 12 by means of a split collet 40 surrounding the pin 36 within the bushing 38 in substantially the same manner as disclosed and claimed in my said co-pending application.

A nut 42 of metallic material is inserted between a contact point 44 mounted on the pin 36 and locking the nut 42 with respect to pin 36. The plug 16 carries a contact pin 46 within the case 14 and a resilient contactor in the nature of a coil spring 48, is compressed between the contact point 44 and the contact pin 46.

The reflector or mirror 28 is disposed in alignment with a port 50 in the tube 12 which is in turn aligned with an opening 52 in the case 14. Transparent members 54 and 56 are cemented in the port 50 and the opening 52, respectively, such members being either in the form of a shield or a lens as desired. An insulating and spacer bushing in the nature of a split sleeve 58 surrounds the tube 12 adjacent the lowermost end thereof to hold the tube separated from the case 14 and to electrically insulate these two portions of the device apart. Sleeve 58 is preferably inserted within the tube 12 and bears against a stop 60 in the nature of a downwardly facing shoulder in the case 14 to limit the extent of upward movement of tube 12 with respect to case 14. Tube 12 is provided with a pair of opposed, transversely arcuate pole members 62 disposed between the mirror 28 and the sleeve 58, presenting a relatively small air gap 64 therebetween to increase the flux density.

The case 14 is in turn provided with a pair of polygonal pole pieces 66 in direct axial alignment with the pole members 62 and communicating with longitudinal bore 68 through the case 14. The uppermost end of the tube 12 is held apart from the case 14 by a tubular insulating element 70 that surrounds the tube 12 and setscrews 34, and is provided with an out-turned flange 72 that overlaps the uppermost end of the case 14. The extension 18 of tube 12 receives a nut-like electric terminal 74 which clamps the flange 72 tightly against the case 14, holding the tube 12 against rotation with respect to the case 14 and clamping the split sleeve 58 tightly against the shoulder 60. A setscrew 76 locks the terminal 74 against rotation with respect to the tube 12.

An insulator block 78 provided with a pair of cavities 80 rendering screws 82 accessible, is mounted directly upon the case 14 adjacent the uppermost end thereof by the screws 82. The block 78 has a bore 84 therethrough intersecting the cavities 80 for rendering accessible a screw element 86 that mounts a second electrical terminal 88 in the bore 84. An insulated, electrical conductor 90 is coupled at one end thereof with the contact pin 46 and extends through a nylon insulating bushing 92 in the case 14 and thence upwardly along one face of case 14 within a groove 94 alongside one of the pole pieces 66 as shown in Fig. 1 beneath the block 78 and thence through a hole 96 in the block 78 between the cavities 80 and intersecting the bore 84. When the screw element 86 is inserted into the bore 84 to fasten the terminal 88 therein, it establishes an electrical contact between the conductor 90 and the pin 86, a portion of the insulation around conductor 90 having been removed for the purpose.

It is now seen that by virtue of the fact that the lowermost end of the tube 12 is closed tightly through employment of bushing 38, collet 40 and pin 36 and that the upper end of the tube 12 is closed by the terminal 74, the tubular barrel 12 may be filled with a suitable type of fluid to provide for viscous dampening of the suspension assembly which includes coil 22, ribbons 24 and 26 and the mirror 28.

The primary object of the invention as initially set forth herein now further becomes obvious since it can be seen that the mirror 28 is rendered adjustable with respect to the port 50 of barrel 12 because unlimited rotation of pins 32 and 36 simultaneously may take place without twisting or turning the coil 22 or winding either of the ribbons 24 or 26 with respect to the coil 22, the spring 30 or the pin 36. Furthermore, the reflector 28 may be positioned vertically with respect to the port 50 and the proper tension placed upon the suspension assembly by merely raising or lowering the pin 32 with respect to the tube 12 prior to fastening down of the setscrews 34. Thereupon, after mounting of the entire galvanometer 10 within the case 14, the tube 12 may be rotated with respect to the case 14 to align the mirror 28 as desired with respect to the opening 52, and more particularly with respect to the photographic film of the oscillograph camera without affecting the torsion of the suspension assembly within the galvanometer 10 in any way whatsoever.

It is to be noted at this point that during rotation of the galvanometer 10 within the case 14, the contact point 44 is free to rotate with respect to the spring 48 and will always be maintained in electrical engagement therewith. No locking means need be provided to hold the galvanometer 10 against rotation within case 14, since the tight frictional fit will hold it in adjustment. Furthermore, the tension on the spring 48 is easily adjusted by loosening of the setscrew 20 and shifting plug 16. The manner of mounting the block 78, attaching the terminal 88 and connecting the same with the conductor 90 itself, need not be further described.

While details of construction may vary considerably, it is to be appreciated that there has herein been provided a galvanometer assembly that will meet all of the difficulties initially enumerated and, therefore, it is desired to be limited only by the spirit of the invention as defined by the appended claims.

Having thus described the invention, what is claimed as new and desired to be secured by Letters Patent is:

1. In a galvanometer assembly, an elongated case having a longitudinal bore; a galvonometer including an elongated tube rotatably mounted in the bore; releasable means on the tube exteriorly of the case holding the tube against reciprocation longitudinally of the bore and against rotation relative to the case; a contact member mounted on one end of the tube within the case and provided with a conical tip; a plug closing one end of the case; and a coil spring adapted for connection with an electric circuit, said spring being interposed between the plug and the contact member within the case and receiving said tip at one end thereof.

2. In a galvanometer assembly, an elongated case having a longitudinal bore; a galvanometer including an elongated tube rotatably mounted in the bore; releasable means on the tube exteriorly of the case holding the tube against reciprocation longitudinally of the bore and against rotation relative to the case; a contact member mounted on one end of the tube within the case and provided with a conical tip; a plug closing one end of the case; a coil spring adapted for connection with an electric circuit, said spring being interposed between the plug and the contact member within the case and receiving said tip at one end thereof, said plug being reciprocable in the bore for adjusting the tension of the spring; and release means holding the plug rigid to the case.

3. In a galvanometer assembly, an elongated, metallic case; a metallic galvanometer in said case; a downwardly facing shoulder formed in the case; stop means on the galvanometer; take-up terminal means on the galvanometer at one end thereof exteriorly of the case for drawing the galvanometer longitudinally in one direction to clamp the stop means tightly against the shoulder and thereby hold the galvanometer against rotation relative to the case; terminal means within the case and frictionally engaging the galvanometer at the opposite end thereof; and conductor means connected with said last-mentioned terminal means and extending from the case, the last-mentioned terminal means comprising a resilient contactor, there being means mounting the contactor within the case for adjusting the resiliency of said contactor.

4. In a galvanometer assembly, an elongated, metallic case; a metallic galvanometer in said case; a downwardly facing shoulder formed in the case; stop means on the galvanometer; take-up terminal means on the galvanometer at one end thereof exteriorly of the case for drawing the galvanometer longitudinally in one direction to clamp the stop means tightly against the shoulder and thereby hold the galvanometer against rotation relative to the case; terminal means within the case and frictionally engaging the galvanometer at the opposite end thereof; and conductor means connected with said last-mentioned terminal means and extending from the case, said last-mentioned terminal means comprising a coil spring, said galvanometer having a contact point rotatable within the spring upon release of said take-up terminal means.

5. In a galvanometer assembly, an elongated, metallic case; a metallic galvanometer in said case; a downwardly-facing shoulder formed in the case; stop means on the galvanometer; take-up terminal means on the galvanometer at one end thereof exteriorly of the case for drawing the galvanometer longitudinally in one direction to clamp the stop means tightly against the shoulder and thereby hold the galvanometer against rotation relative to the case; terminal means within the case and frictionally engaging the galvanometer at the opposite end thereof; and conductor means connected with said last-mentioned terminal means and extending from the case, said stop means comprising a spacer of electrical insulating material for isolating the galvanometer from the case, there being an electrical insulating sleeve separating the galvanometer and the take-up terminal means from the case, said last-mentioned terminal means comprising a coil spring, said galvanometer having a contact point rotatable within the spring upon release of said take-up terminal means, there being a plug of electrical insulating material mounting the spring within the case.

References Cited in the file of this patent

UNITED STATES PATENTS

| | | |
|---|---|---|
| 2,149,442 | Kannenstine | Mar. 7, 1939 |
| 2,268,526 | Palmer | Dec. 30, 1941 |
| 2,439,576 | Morrow | Apr. 13, 1948 |
| 2,463,844 | Anderson | Mar. 8, 1949 |
| 2,550,720 | Richardson | May 1, 1951 |
| 2,571,776 | Staff | Oct. 16, 1951 |
| 2,596,019 | Fisher | May 6, 1952 |

FOREIGN PATENTS

| | | |
|---|---|---|
| 4276/92 | Great Britain | Jan. 7, 1893 |